United States Patent
Massari et al.

(10) Patent No.: US 11,149,101 B2
(45) Date of Patent: Oct. 19, 2021

(54) PROPYLENE COPOLYMERS

(71) Applicant: BASELL POLIOLEFINE ITALIA S.R.L., Milan (IT)

(72) Inventors: Paola Massari, Ferrara (IT); Caroline Cathelin, Ferrara (IT); Claudio Cavalieri, Ferrara (IT); Marco Ciarafoni, Ferrara (IT); Roberto Pantaleoni, Ferrara (IT); Giampiero Morini, Ferrara (IT); Gianni Vitale, Ferrara (IT); Fabrizio Piemontesi, Ferrara (IT); Gianni Collina, Ferrara (IT); Benedetta Gaddi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 112 days.

(21) Appl. No.: 16/632,175

(22) PCT Filed: Jul. 3, 2018

(86) PCT No.: PCT/EP2018/067900
§ 371 (c)(1),
(2) Date: Jan. 17, 2020

(87) PCT Pub. No.: WO2019/015949
PCT Pub. Date: Jan. 24, 2019

(65) Prior Publication Data
US 2020/0231723 A1 Jul. 23, 2020

(30) Foreign Application Priority Data
Jul. 19, 2017 (EP) .................................. 17182151

(51) Int. Cl.
*C08F 210/06* (2006.01)
*C08F 210/14* (2006.01)
*C08J 5/18* (2006.01)

(52) U.S. Cl.
CPC .......... *C08F 210/06* (2013.01); *C08F 210/14* (2013.01); *C08J 5/18* (2013.01); *C08F 2500/12* (2013.01); *C08F 2500/27* (2021.01); *C08F 2500/34* (2021.01); *C08F 2500/35* (2021.01); *C08F 2800/20* (2013.01); *C08J 2323/14* (2013.01)

(58) Field of Classification Search
None
See application file for complete search history.

(56) References Cited

U.S. PATENT DOCUMENTS

| 2014/0039124 A1* | 2/2014 | Reichelt ............. C09D 123/142 525/53 |
| 2014/0356565 A1 | 12/2014 | Klimke et al. |
| 2018/0362682 A1* | 12/2018 | Cavalieri ................ B32B 27/32 |

FOREIGN PATENT DOCUMENTS

| EA | 201400720 A1 | 10/2014 |
| RU | 2471813 C2 | 1/2013 |
| RU | 2015144626 A | 5/2017 |
| WO | 2012093099 A1 | 7/2012 |
| WO | 2015169831 A1 | 11/2015 |
| WO | 2017097578 A1 | 6/2017 |

OTHER PUBLICATIONS

International Search Report and Written Opinion dated Oct. 15, 2018 (Oct. 15, 2018) for Corresponding PCT/EP2018/067900.

\* cited by examiner

*Primary Examiner* — Richard A Huhn

(57) ABSTRACT

A propylene 1-hexene copolymer containing from 5.7 to 7.7% by weight of 1-hexene derived units, based upon the total weight of the propylene 1-hexene copolymer, having:
a) a solubility in xylene at 25° C. ranging from 7.0 wt % to 15.0 wt %, based upon the total weight of the propylene 1-hexene copolymer;
b) a melting temperature, measured by DSC ranging from 143.0° C. to 148.0° C.;
c) a Melt Flow Rate (MFR, measured according to ASTM D 1238, 230° C./2.16 kg) from 3.5 to 8.0 g/10 min.; and
d) a content of 1-hexene derived units in the fraction soluble in xylene at 25° C. ranging from 13.5 wt % to 18.5 wt %, based upon the total weight of the soluble fraction.

12 Claims, No Drawings

PROPYLENE COPOLYMERS

This application is the U.S. National Phase of PCT International Application PCT/EP2018/067900, filed Jul. 3, 2018, claiming benefit of priority to European Patent Application No. 17182151.5, filed Jul. 19, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to copolymers of propylene and films made therefrom.

BACKGROUND OF THE INVENTION

In some instances, copolymers of propylene and 1-hexene have a molecular weight distribution of monomodal type and are used for pipes systems.

In some instances, multimodal copolymers of propylene and 1-hexene are used for the production of industrial sheets.

SUMMARY OF THE INVENTION

In a general embodiment, the present disclosure provides a propylene 1-hexene copolymer containing from 5.7 to 7.7% by weight of 1-hexene derived units, based upon the total weight of the propylene 1-hexene copolymer, having:

a) a solubility in xylene at 25° C. ranging from 7.0 wt % to 15.0 wt %, based upon the total weight of the propylene 1-hexene copolymer;

b) a melting temperature, measured by DSC, ranging from 143.0° C. to 148.0° C.;

c) a Melt Flow Rate (MFR, measured according to ASTM D 1238, 230° C./2.16 kg, that is, at 230° C., with a load of 2.16 kg) from 3.5 to 8.0 g/10 min; and d) a content of 1-hexene derived units in the fraction soluble in xylene at 25° C. ranging from 13.5 wt % to 18.5 wt %, based upon the total weight of the soluble fraction.

DETAILED DESCRIPTION OF THE INVENTION

In some embodiments, the present disclosure provides a propylene 1-hexene copolymer containing from 5.7 to 7.7% by weight, alternatively from 5.9 to 7.5% by weight, alternatively from 6.0 to 7.0% by weight of 1-hexene derived units, based upon the total weight of the propylene 1-hexene copolymer, having:

a) a solubility in xylene at 25° C. ranging from 7.0 wt % to 15.0 wt % alternatively from 8.0 wt % to 14.0 wt %; alternatively from 8.5 wt % to 13.5 wt %, based upon the total weight of the propylene 1-hexene copolymer;

b) a melting temperature, measured by DSC, ranging from 143.0° C. to 148.0° C.; alternatively from 144.0° C. to 147.0° C.;

c) a Melt Flow Rate (MFR, measured according to ASTM D 1238, 230° C./2.16 kg, that is, at 230° C., with a load of 2.16 kg) from 3.5 to 8.0 g/10 min; alternatively from 3.8 to 7.5 g/10 min; alternatively from 4.0 to 6.5 g/10 min; and d) a content of 1-hexene derived units in the fraction soluble in xylene at 25° C. ranging from 13.5 wt % to 18.5 wt %; alternatively from 14.0 wt % to 17.5 wt %; alternatively from 14.5 wt % to 17.0 wt %, based upon the total weight of the soluble fraction.

In some embodiments, propylene 1-hexene copolymer contains propylene and 1-hexene derived units.

As used herein, the amounts of 1-hexene units are referred to the total weight of the copolymer.

The melting temperature values are determined by differential scanning calorimetry (DSC), according to ISO 11357-3, with a heating rate of 20° C./minute.

In some embodiments, the propylene 1-hexene copolymer of the present disclosure has a haze, measured on a 50 μm film, lower than 0.40%, alternatively lower than 0.30%.

In some embodiments, the propylene 1-hexene copolymer of the present disclosure is obtained with polymerization processes carried out in the presence of stereospecific Ziegler-Natta catalysts supported on magnesium dihalides. In some embodiments, the process includes the use of a molecular weight regulator. In some embodiments, the molecular weight regulator is hydrogen.

In some embodiments, the stereospecific polymerization catalysts are made from or contain the product of a reaction between:

1) a solid component, containing a titanium compound and an electron-donor compound (internal donor) supported on magnesium dihalide;

2) an aluminum alkyl compound (cocatalyst); and, optionally, 3) an electron-donor compound (external donor). In some embodiments, the halide of the dihalide was chloride.

In some embodiments, the catalysts can produce homopolymers of propylene having an isotactic index higher than 90% (measured as weight amount of the fraction insoluble in xylene at room temperature).

In some embodiments, the solid catalyst component (1) contains, as electron-donor, a compound selected from the group consisting of the ethers, ketones, lactones, compounds containing N, P and/or S atoms, and mono- and dicarboxylic acid esters.

In some embodiments, the catalysts are selected from the catalysts described in U.S. Pat. No. 4,399,054 and European Patent No. 45977.

In some embodiments, the electron-donor compounds are selected from the group consisting of phthalic acid esters and succinic acid esters.

In some embodiments, the succinic acid esters are represented by the formula (I):

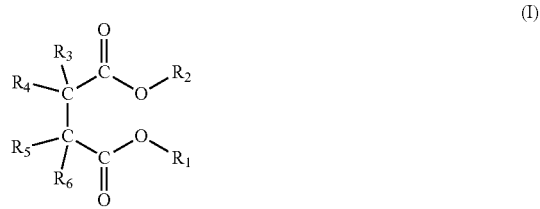

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms. In some embodiments, the radicals $R_3$ to $R_6$, which are joined to the same carbon atom, to form a cycle.

In some embodiments, $R_1$ and $R_2$ are selected from the group consisting of C1-C8 alkyl, cycloalkyl, aryl, arylalkyl and alkylaryl groups. In some embodiments, $R_1$ and $R_2$ are selected from primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, the at least two radicals different from hydrogen are linked to different carbon atoms, (a) $R_3$ and $R_5$ or (b) $R_4$ and $R_6$.

In some embodiments, other electron-donors are the 1,3-diethers described in published European Patent Application Nos. EP-A-361 493 and 728769.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) used as external electron-donors (added to the Al-alkyl compound) are made from or contain aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine. In some embodiments, the silicon compounds have the formula $R_a^1R_b^2Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

In some embodiments, the silicon compound is thexyltrimethoxysilane (which has the synonym 2,3-dimethyl-2-trimethoxysilyl-butane).

In some embodiments, the 1,3-diethers are used as external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the propylene-hexene-1 polymers are produced with a polymerization process as described in European Patent Application No. 1 012 195.

In some embodiments, the process includes feeding the monomers to polymerization zones in the presence of catalyst under reaction conditions and collecting the polymer product from the polymerization zones. In the process, the growing polymer particles flow upward through a first polymerization zone (riser) under fast fluidization conditions, leave the riser and enter a second polymerization zone (downcomer) through which the growing polymer particles flow downward in a densified form under the action of gravity, leave the downcomer and are reintroduced into the riser, thereby establishing a circulation of polymer between the riser and the downcomer.

In the downcomer, high values of density of the solid are reached, which approach the bulk density of the polymer. In some embodiments, a positive gain in pressure is obtained along the direction of flow, thereby permitting reintroduction of the polymer into the riser without mechanical assistance and establishing a "loop" circulation, which is defined by the balance of pressures between the two polymerization zones and the head loss introduced into the system.

In some embodiments, the condition of fast fluidization in the riser is established by feeding a gas mixture made from or containing monomers to the riser. In some embodiments, the feeding of the gas mixture is effected below the point of reintroduction of the polymer into the riser by a gas distributor. In some embodiments, the velocity of transport gas into the riser is higher than the transport velocity under the operating conditions. In some embodiments, the velocity of the transport gas was from 2 to 15 m/s.

In some embodiments, the polymer and the gaseous mixture leaving the riser are conveyed to a solid/gas separation zone. From the separation zone, the polymer enters the downcomer. The gaseous mixture leaving the separation zone is compressed, cooled and transferred to the riser. In some embodiments, the gaseous mixture included the addition of make-up monomers and/or molecular weight regulators. In some embodiments, the transfer occurs via a recycle line for the gaseous mixture.

In some embodiments, the control of the polymer circulating between the two polymerizations zones involved metering the amount of polymer leaving the downcomer. In some embodiments, the flow of solids was controlled with mechanical valves.

In some embodiments, the temperature of the polymerization process was between 50 to 120° C.

In some embodiments, the first stage process was carried out under operating pressures of between 0.5 and 10 MPa, alternatively between 1.5 to 6 MPa.

In some embodiments, one or more inert gases are maintained in the polymerization zones, in such quantities that the sum of the partial pressure of the inert gases is between 5 and 80% of the total pressure of the gases. In some embodiments, the inert gas is nitrogen or propane.

In some embodiments, the various catalysts are fed up to the riser at any point of the riser. In some embodiments, the catalysts are fed at any point of the downcomer. In some embodiments, the catalyst is in any physical state. In some embodiments, the catalysts are in either solid or liquid state.

In some embodiments, the copolymer also contains additives. In some embodiments, the additives are selected from the group consisting of nucleating and clarifying agents and processing aids.

In some embodiments, the propylene 1-hexene copolymer is used for the production of films. In some embodiments, the film is a cast or biaxially oriented polypropylene (BOPP) film. In some embodiments, the film is a monolayer or a multilayer film, wherein at least one layer is made from or contains a propylene 1-hexene copolymer of the present disclosure.

The following examples are given for illustration without limiting purpose.

EXAMPLES

The data relating to the polymeric materials and the films of the examples are determined by way of the methods reported below.

Melting Temperature (ISO 11357-3)

Determined by differential scanning calorimetry (DSC). A sample weighing 6±1 mg, was heated to 200±1° C. at a rate of 20° C./min and kept at 200±1° C. for 2 minutes in nitrogen stream. The sample was thereafter cooled at a rate of 20° C./min to 40±2° C., thereby kept at this temperature for 2 min to crystallize the sample. Then, the sample was again fused at a temperature rise rate of 20° C./min up to 200° C.±1. The melting scan was recorded, a thermogram was obtained (° C. vs. mW), and, from this, temperatures corresponding to peaks were read. The temperature corresponding to the most intense melting peak recorded during the second fusion was taken as the melting temperature.

Melt Flow Rate (MFR)

Determined according to ASTM D 1238, at 230° C., with a load of 2.16 kg.

Solubility in Xylene at 25° C.

2.5 g of polymer and 250 ml of xylene were introduced in a glass flask equipped with a refrigerator and a magnetic stirrer. The temperature was raised in 30 minutes up to the boiling pint of the solvent. The resulting clear solution was then kept under reflux and stirring for further 30 minutes. The closed flask was then kept for 30 minutes in a bath of ice and water and in thermostatic water bath at 25° C. for 30 minutes as well. The resulting solid was filtered on quick filtering paper. 100 ml of the filtered liquid were poured in a pre-weighed aluminium container, which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated.

Determination of 1-Hexene Content by NMR $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum center (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene as molar percent was calculated from diad using the following relations:

[P]=PP+0.5PH

[H]=HH+0.5PH

Assignments of the $^{13}$C NMR spectrum of propylene/1-hexene copolymers were calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma} + S_{\alpha\delta}$ | PE |
| 5 | 35.70-35.0 | $4B_4$ | H |
| 6 | 35.00-34.53 | $S_{\alpha\gamma} + S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Seal Initiation Temperature (SIT)

Preparation of the Film Specimens

Some films with a thickness of 50 μm were prepared by extruding each test composition in a a single screw Collin extruder (length/diameter ratio of screw 1:25) at a film drawing speed of 7 m/min and a melt temperature of 210-250° C. Each resulting film was superimposed on a 1000 μm thick film of a propylene homopolymer having a xylene insoluble fraction of 97 wt % and an MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor of 6 with a Karo 4 Brueckener film stretcher at 160° C., thereby obtaining a 20 μm thick film (18 μm homopolymer+2 μm test).

Determination of the SIT.

Film Strips, 6 cm wide and 35 cm length were cut from the center of the BOPP film. The film was superimposed with a BOPP film made of PP homopolymer. The superimposed specimens were sealed along one of the 2 cm sides with a Brugger Feinmechanik Sealer, model HSG-ETK 745. Sealing time was 5 seconds at a pressure of 0.14 MPa (20 psi). The starting sealing temperature was from about 10° C. less than the melting temperature of the test composition. The sealed strip was cut in 6 specimens 15 mm wide long enough to be claimed in the tensile tester grips. The seal strength was tested at a load cell capacity 100 N, cross speed 100 mm/min and grip distance 50 mm. The results were expressed as the average of maximum seal strength (N). The unsealed ends were attached to an Instron machine where the sample specimens were tested at a traction speed of 50 mm/min.

The test was repeated by changing the temperature as follows:

If seal strength<1.5 N then increase the temperature

If seal strength>1.5 N then decrease the temperature

Temperature variation was adjusted stepwise. If seal strength was close to target, steps of 1° C. were selected. If the strength was far from target, steps of 2° C. were selected.

The target seal strength (SIT) was defined as the lowest temperature at which a seal strength higher or equal to 1.5 N was achieved.

The SIT was the minimum sealing temperature at which the seal does not break when a load of at least 2 Newtons was applied in the test conditions.

Determination of the Haze

Some films with a thickness of 50 μm were prepared by extruding each test composition in a a single screw Collin extruder (length/diameter ratio of screw 1:25) at a film drawing speed of 7 m/min and a melt temperature of 210-250° C.

The haze value was measured using a Gardner photometric unit connected to a Hazemeter type UX-10 or an equivalent instrument having G.E. 1209 light source with filter "C". Reference samples were used for calibrating the instrument according to ASTM D1003.

Preparation of the Copolymer of Propylene with 1-Hexene

Examples 1-3 and Comparative Example 4

Procedure for the Preparation of the Spherical Adduct

Microspheroidal $MgCl_2 \cdot pC_2H_5OH$ adduct was prepared according to the method described in Comparative Example 5 of Patent Cooperation Treaty Publication No. WO98/44009, with the difference that $BiCl_3$ in a powder form and in the amount of 3 mol % with respect to the magnesium was added before feeding the oil.

Procedure for the Preparation of the Solid Catalyst Component

Into a 500 ml round bottom flask, equipped with a mechanical stirrer, a cooler and a thermometer, 300 ml of $TiCl_4$ were introduced at room temperature under nitrogen atmosphere. After cooling to 0° C., while stirring, diisobutylphthalate and 9.0 g of the spherical adduct were sequentially added into the flask. The amount of charged internal donor was to meet a Mg/donor molar ratio of 8. The temperature was raised to 100° C. and maintained for 2 hours. Thereafter, stirring was stopped, the solid product was allowed to settle and the supernatant liquid was siphoned off at 100° C. After the supernatant was removed, additional fresh $TiCl_4$ was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times in temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethyl aluminum (TEAL) and diisopropyl dimethoxy silane as external donor as reported in Table 1.

Polymerization

Copolymers were prepared by polymerizing propylene and hexene-1 in the presence of a catalyst under continuous conditions in a plant including a polymerization apparatus as described in European Patent No. EP 1 012 195. No barrier was used.

The polymerization apparatus included two interconnected cylindrical reactors, a riser and a downcomer. Fast fluidization conditions were established in the riser by recycling gas from the gas-solid separator.

The main polymerization conditions are reported in Table 1.

TABLE 1

| Example | | | Comp 4 | 1 | 2 | 3 |
|---|---|---|---|---|---|---|
| TEAL/external donor | | wt/wt | 6.5 | 6.5 | 6.5 | 6.5 |
| TEAL/catalyst | | wt/wt | 5 | 5 | 5 | 5 |
| Temperature | | ° C. | 81 | 86 | 86 | 86 |
| Pressure | | bar-g | 21 | 21 | 21 | 21 |
| Split holdup | riser | wt % | 40 | 40 | 40 | 40 |
| | downcomer | wt % | 60 | 60 | 60 | 60 |
| C6 | | mole % | 4.6 | 5.95 | 5.4 | 6.1 |
| $H_2/C_3^-$ | | mol/mol | 0.016 | 0.016 | 0.016 | 0.016 |
| C6/C6 + C3 | | mol/mol | 0.052 | 0.07 | 0.064 | 0.073 |

C3 = propylene;
C6 = 1-hexene
H2 = hydrogen

The polymer particles exiting the reactor were subjected to a steam treatment to remove the reactive monomers and volatile substances, and then dried.

The properties of the copolymer obtained in examples 1-4 are reported in Table 2.

Comparative Example 5

Comparative example 5 was prepared to the description of example 1 of Patent Cooperation Treaty Application No. PCT/EP2016/078415

The properties of the copolymers obtained in comparative example 5 are reported in Table 2.

TABLE 2

| | | Ex 1 | Ex 2 | Ex 3 | Comp Ex 4 | Comp Ex 5 |
|---|---|---|---|---|---|---|
| 1-hexene content total | wt % | 6.0 | 6.5 | 7.0 | 4.7 | 7.4 |
| 1-hexene content in the fraction soluble in Xylene at 25° C. | wt % | 15.6 | 14.6 | 16.6 | 13.0 | nm |
| MFR | g/10 min | 5.8 | 6.7 | 5.7 | 4.5 | 4.4 |
| xylene solubles 25° C. | wt % | 9.1 | 10.7 | 13.0 | 3.8 | 18.0 |
| melting temperatures | ° C. | 144.6 | 144.8 | 145.8 | 146.5 | 143.7 |
| Haze (film) | % | 0.21 | 0.40 | 0.20 | 0.79 | 0.55 |
| SIT | ° C. | 106 | 103 | 100 | 114 | 91 | nm = not measured

What is claimed is:
1. A propylene 1-hexene copolymer containing from 5.7 to 7.7% by weight of 1-hexene derived units, based upon the total weight of the propylene 1-hexene copolymer, having:
   a) a solubility in xylene at 25° C. ranging from 7.0 wt % to 15.0 wt %, based upon the total weight of the propylene 1-hexene copolymer;

b) a melting temperature, measured by DSC ranging from 143.0° C. to 148.0° C.;

c) a Melt Flow Rate (MFR, measured according to ASTM D 1238, 230° C./2.16 kg) from 3.5 to 8.0 g/10 min.; and d) a content of 1-hexene derived units in the fraction soluble in xylene at 25° C. ranging from 13.5 wt % to 18.5 wt %, based upon the total weight of the soluble fraction.

2. The propylene 1-hexene copolymer according to claim 1 containing from 5.9 to 7.5% by weight of 1-hexene derived units, based upon the total weight of the propylene 1-hexene copolymer.

3. The propylene 1-hexene copolymer according to claim 1 containing from 6.0 to 7.0% by weight of 1-hexene derived units, based upon the total weight of the propylene 1-hexene copolymer.

4. The propylene 1-hexene copolymer according to claim 1, wherein the solubility in xylene at 25° C. ranges from 8.0 wt % to 14.0 wt %, based upon the total weight of the propylene 1-hexene copolymer.

5. The propylene 1-hexene copolymer according to claim 1, wherein the solubility in xylene at 25° C. ranges from 8.5 wt % to 13.5 wt %, based upon the total weight of the propylene 1-hexene copolymer.

6. The propylene 1-hexene copolymer according to claim 1, wherein the melting temperature, measured by DSC, ranges from 144.0° C. to 147.0° C.

7. The propylene 1-hexene copolymer according to claim 1, wherein the content of 1-hexene derived units in the fraction soluble in xylene at 25° C. ranging from 14.0 wt % to 17.5 wt %, based upon the total weight of the soluble fraction.

8. The propylene 1-hexene copolymer according to claim 1, wherein the content of 1-hexene derived units in the fraction soluble in xylene at 25° C. ranging from 14.5 wt % to 17.0 wt %, based upon the total weight of the soluble fraction.

9. The propylene 1-hexene copolymer according to claim 1, wherein the Melt Flow Rate ranges from 3.8 to 7.5 g/10 min.

10. The propylene 1-hexene copolymer according to claim 1, wherein the Melt Flow Rate ranges from 4.0 to 6.5 g/10 min.

11. A film comprising:
the propylene 1-hexene copolymer of claim 1.

12. The film of claim 11 being a biaxially-oriented polypropylene film.

* * * * *

UNITED STATES PATENT AND TRADEMARK OFFICE
CERTIFICATE OF CORRECTION

PATENT NO. : 11,149,101 B2
APPLICATION NO. : 16/632175
DATED : October 19, 2021
INVENTOR(S) : Massari et al.

It is certified that error appears in the above-identified patent and that said Letters Patent is hereby corrected as shown below:

On the Title Page

Column 1, Item (30), Line 1, delete "17182151" and insert -- 17182151.5 --, therefor Signed and Sealed this
Thirty-first Day of January, 2023

Katherine Kelly Vidal
*Director of the United States Patent and Trademark Office*